(12) United States Patent
Chung

(10) Patent No.: US 9,537,317 B2
(45) Date of Patent: Jan. 3, 2017

(54) POWER MANAGEMENT SYSTEM AND METHOD FOR CONTROLLING THE SAME

(75) Inventor: Jae Won Chung, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 300 days.

(21) Appl. No.: 13/200,595

(22) Filed: Sep. 27, 2011

(65) Prior Publication Data

US 2012/0089665 A1     Apr. 12, 2012

(30) Foreign Application Priority Data

Oct. 12, 2010  (KR) ........................ 10-2010-0099069

(51) Int. Cl.
*G06F 15/16* (2006.01)
*H02J 3/14* (2006.01)
(Continued)

(52) U.S. Cl.
CPC ................. *H02J 3/14* (2013.01); *G05B 15/02* (2013.01); *H04L 12/2823* (2013.01); *H04L 29/06* (2013.01); *H04L 29/08072* (2013.01); *G05B 2219/2639* (2013.01); *H02J 2003/146* (2013.01); *Y02B 70/325* (2013.01); *Y02B 70/3225* (2013.01); *Y04S 20/222* (2013.01); *Y04S 20/224* (2013.01); *Y04S 20/228* (2013.01)

(58) Field of Classification Search
CPC .... H04L 29/08072; H04L 29/06; G05B 15/02; G05B 2219/2639
USPC ............................ 709/203–205; 715/716–718
See application file for complete search history.

(56) References Cited

U.S. PATENT DOCUMENTS

2004/0019554 A1   1/2004  Merold et al.
2007/0250772 A1*  10/2007  Milosevski ................... 715/716
(Continued)

FOREIGN PATENT DOCUMENTS

CA       2550738 A1 * 12/2007  ............ G06Q 30/02
CN      101410921       4/2009
(Continued)

OTHER PUBLICATIONS

Chinese Office Action issued Dec. 3, 2014 in corresponding Chinese Patent Application No. 201110259636.4.
(Continued)

*Primary Examiner* — John B Walsh
*Assistant Examiner* — Weiwei Stiltner
(74) *Attorney, Agent, or Firm* — Staas & Halsey LLP

(57) ABSTRACT

A power management apparatus includes a storage unit to store power rate levels corresponding to a plurality of power rates, and store display information corresponding to the power rate levels, a communication unit to receive power rates for each hour of each day from a power provider, a controller to confirm power rate levels corresponding to power rates for each hour of each day, and confirm display information for each power rate level, and a control panel unit to display the power rates for each hour of each day according to individual power rate levels, the displayed power rate levels being displayed as different types of display information. The power management apparatus allows the user to intuitively recognize the current power rate and the current power rate level, and predicts the future power rates and the future power rate level, such that it can establish an optimum power use schedule.

21 Claims, 9 Drawing Sheets

(51) Int. Cl.
*H04L 29/08* (2006.01)
*H04L 29/06* (2006.01)
*G05B 15/02* (2006.01)
*H04L 12/28* (2006.01)

(56) References Cited

U.S. PATENT DOCUMENTS

| | | | |
|---|---|---|---|
| 2008/0146351 A1* | 6/2008 | Packes, et al. | 463/47 |
| 2010/0060479 A1* | 3/2010 | Salter | 340/870.4 |
| 2010/0070101 A1 | 3/2010 | Benes et al. | |
| 2010/0262554 A1* | 10/2010 | Elliott | 705/323 |
| 2011/0046806 A1* | 2/2011 | Nagel et al. | 700/291 |
| 2011/0264290 A1* | 10/2011 | Drew | 700/291 |
| 2011/0264588 A1* | 10/2011 | Jensen et al. | 705/80 |
| 2011/0285546 A1* | 11/2011 | Vadali | 340/870.16 |
| 2012/0023977 A1* | 2/2012 | Kim et al. | 62/89 |
| 2012/0042124 A1* | 2/2012 | Miyamoto et al. | 711/114 |

FOREIGN PATENT DOCUMENTS

| | | | |
|---|---|---|---|
| CN | 101765758 | | 6/2010 |
| JP | 2002258934 | * | 9/2002 |
| JP | 2006-017645 | | 1/2006 |
| JP | 2008-158557 | | 7/2008 |
| KR | 10-2010-0037910 | | 4/2010 |
| WO | WO 02/084309 | | 10/2002 |
| WO | WO 02084309 | * | 10/2002 |

OTHER PUBLICATIONS

Chinese Office Action dated Aug. 12, 2015 in corresponding Chinese Patent Application No. 201110259636.4.
Chinese Decision on Grant dated Jul. 25, 2016 in corresponding Chinese Patent Application No. 201110259636.4.

* cited by examiner

POWER MANAGEMENT SYSTEM AND METHOD FOR CONTROLLING THE SAME

CROSS-REFERENCE TO RELATED APPLICATIONS

This application claims the benefit of Korean Patent Application No. 10-2010-0099069, filed on Oct. 12, 2010 in the Korean Intellectual Property Office, the disclosure of which is incorporated herein by reference.

BACKGROUND

1. Field

Embodiments relate to a power management system for informing a user of power rates transferred from a power provider, and a method for displaying the power rates.

2. Description of the Related Art

With the development of Information Technology (IT), the number of household appliances powered by electricity is rapidly increasing, in turn leading to increasing power consumption. In order to satisfy such increased power demand, the number of power plants is rapidly increasing. However, as can be seen from a power demand pattern, peak capacity is not reached during most days of the year, that is to say, power plants only operate at full capacity during a few days out of the year.

A status in which a high power demand is required for a short time is called peak load. During periods of peak load, electricity costs the most to generate and deliver, and therefore power providers raise the power rate charged to consumers during periods of peak load. Construction costs for adding an additional power plant to the grid are extremely high and maintenance costs for power plants constructed to maintain peak load for a short period are considerable.

Recently, numerous developers are conducting intensive research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. For example, the consumer may temporarily stop an air-conditioner so as to reduce power consumption when power rates are high.

By means of the DR, a power-supply source can alter user power consumption to achieve load balancing and can restrict user power consumption to periods when demand is low, thereby reducing the user's overall energy expenditure.

Therefore, an energy management system (EMS) to which DR is applied has been developed. The EMS receives current power rate information from the power provider, displays the current power rate information on a display, and turns an electric device on or off on the basis of the current power rate information.

The EMS displays only the current power rates, such that the user has difficulty in recognizing a level of the current power rates. In addition, the EMS is unable to predict the future power rates and the degree of variation in power rate levels, such that it has difficulty in effectively driving an electric device on the basis of power rates.

SUMMARY

Therefore, it is an aspect to provide a power management system and a method for controlling the same so as to display current and future power rates and current and future power rate levels.

It is another aspect to provide a power management system and a method for controlling the same so as to display the current and future power rates and the current and future power-rate-level degrees.

It is another aspect to provide a power management system which predicts future power rate information using past power consumption pattern, displays the predicted future power rate information and power rate level, and audibly outputs the predicted power rate information and power rate level, and a method for controlling the power management system.

It is another aspect to provide a power management system which displays detailed information concerning a user-selected power rate level, and a method for displaying the same.

Additional aspects will be set forth in part in the description which follows and, in part, will be apparent from the description, or may be learned by practice of the invention.

In accordance with one aspect, a power management apparatus includes a storage unit to store power rate levels corresponding to a plurality of power rates and display information corresponding to the power rate levels, a communication unit to receive power rates for every hour of each day from a power provider, a controller to confirm power rate levels corresponding to power rates for every hour of each day, and confirm display information for each power rate level, and a control panel unit to display the power rates for every hour of each day according to individual power rate levels, wherein the displayed power rate levels are displayed as different types of display information.

The display information may be at least one of color information and icon information.

The control panel unit may display a power rate level for each hour of each day on a clock window.

The clock window may be displayed in the form of a circle, a bar or a digital format.

The controller may determine current time, current power rate level, current power rate, next power rate level and next power rate, and calculates the remaining time until the next power rate level begins. The control panel unit may display the current power rate level, the current power rate, the next power rate level, the next power rate and the remaining time.

The control panel unit may include an input unit to receive any one of the power rate levels, and a display to display power rate information, color information, and sound information in association with the selected power rate level.

The storage unit may further include sound information of the individual power rate levels.

The control panel unit may include a sound unit to output a sound signal corresponding to a power rate level to be changed when the power rate level is changed.

The control panel unit may include an input unit to receive display information and sound information of the individual power rate levels, wherein the controller changes information of the individual power rate levels stored in the storage unit.

The communication unit may communicate with an external terminal and transmits daily power rate level information displayed as different types of display information.

In accordance with another aspect, a power management apparatus includes a storage unit to store power rate levels corresponding to a plurality of power rates, display information corresponding to the power rate levels, and past power consumption pattern information, a communication unit to receive a current power rate from the power provider, a controller to confirm a power rate level corresponding to the current power rate information, predict a future power rate and a future power rate level on the basis of the past power consumption pattern information, the current power rate and the current power rate level, and confirm display information corresponding to the future power rate level, and a control panel unit to display the current and future power rates using power rate levels, wherein the individual power rate levels are displayed as different types of display information.

The past power consumption pattern information may include previous day's power consumption pattern information, previous week's power consumption pattern information, and previous year's power consumption pattern information.

The display information may be at least one of color information and icon information.

The control panel unit may display a power rate level for each hour of each day on a clock window.

The control panel unit may display a power rate level for each of the past 24 hours.

The controller may decide a current time and a next power rate level, calculates a remaining time until the next power rate level is reached, and the control panel unit may display a current power level, a current power rate, a next power rate level, a next power rate, and a remaining time.

The storage unit may further include sound information for each power rate level.

The control panel unit may include a sound unit to output a sound signal corresponding to a power rate level to be changed when the power rate level is changed.

In accordance with another aspect, a method for controlling a power management apparatus includes, upon receiving a power rate for each hour of each day from a power provider, confirming a power rate level for each hour on the basis of the received power rates of individual hours, and displaying the power rate levels of the individual hours of each day, wherein the displayed power rate levels are displayed as different types of display information.

The displaying of the individual power rate levels as different types of display information may include identifying time regions of a clock window on the basis of the power rate level for each hour and displaying the individual time regions of the clock window in different colors assigned to the individual power rate levels.

The displaying of the individual power rate levels as different types of display information may include identifying time regions of a clock window on the basis of the power rate level for each hour, and displaying the time regions of the clock window using different icons assigned to the individual power rate levels.

The method may further include determining a next power rate level, a power rate of the next power rate level, and a time at which the next power rate level begins, calculating the remaining time until the next power rate level is reached, and displaying the next power rate level, a next power rate, and a remaining time.

In accordance with another aspect, a method for controlling a power management apparatus includes, upon receiving a current power rate from a power provider, confirming a current power rate level on the basis of the current power rate, predicting a future power rate and a future power rate level using a prestored past power consumption pattern, and displaying the current power rate level and the predicted future power rate level, wherein the current power rate level and the predicted future power rate level are displayed as different types of display information according to the individual power rate levels.

Usage of the past power consumption pattern may include recognizing power consumption for each hour using a previous day's power consumption pattern, recognizing power consumption for each day using a previous week's power consumption pattern, and recognizing power consumption for each month using a previous year's power consumption pattern.

The displaying of the individual power rate levels as different types of display information may include identifying time regions of a clock window on the basis of the power rate level for each hour, and displaying the time regions of the clock window in different colors assigned to the individual power rate levels.

The displaying of the individual power rate levels as different types of display information may include identifying time regions of the clock window on the basis of the power rate level for each hour, and displaying the time regions of the clock window using different icons assigned to the individual power rate levels.

The method may further include determining a next power rate level, a power rate of the next power rate level, and a time at which the next power rate level begins, calculating the remaining time until the next power rate level begins, and displaying the next power rate level, a next power rate, and a remaining time.

The method may further include displaying a current time.

The method may further include determining whether display information corresponding to any one of power rate levels is selected, and if the display information corresponding to any one of power rate levels is selected, displaying information of the selected power rate level.

The method may further include determining whether an option button is selected by a user. If the option button is selected, display information for each power rate level may be displayed. If the display information is selected by the user, the display information for each power rate level may be changed to the selected display information.

The method may further include determining a variation of the power rate level and, if the power rate level is changed, outputting a sound signal corresponding to the power rate to be changed.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
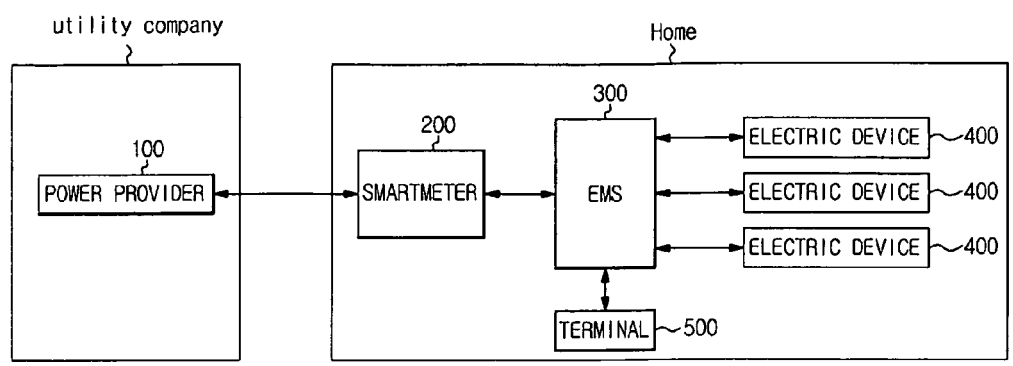
FIG. 1 is a configuration diagram illustrating a power management system including a power management device according to an embodiment.

Reference will now be made in detail to the embodiments, examples of which are illustrated in the accompanying drawings, wherein like reference numerals refer to like elements throughout.

Figure 2:
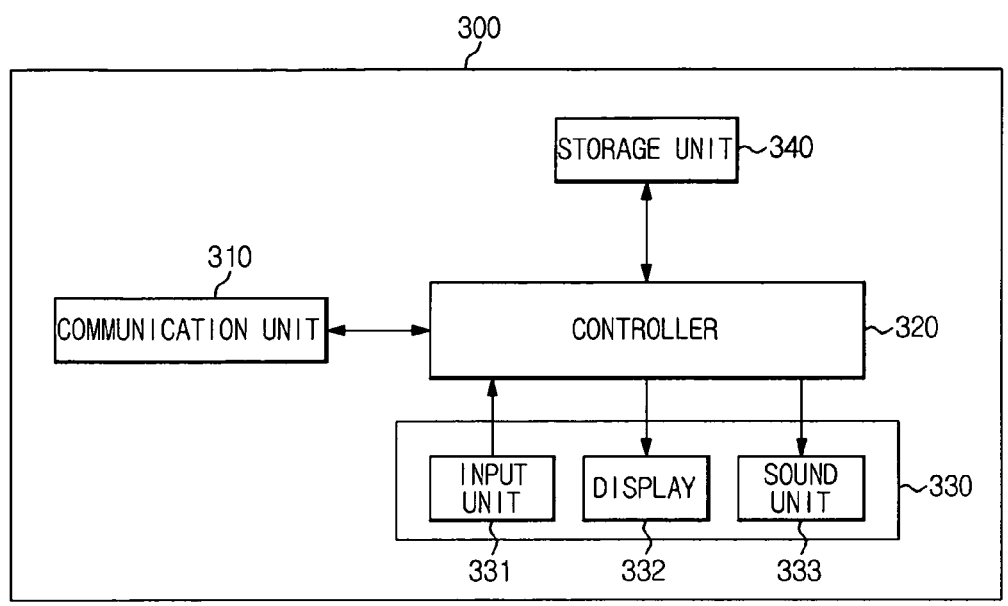
FIG. 2 is a detailed block diagram illustrating a power management system according to an embodiment.

FIG. 1 is a configuration diagram illustrating a power management system including a power management device according to an embodiment. FIG. 2 is a detailed block diagram illustrating a power management system according to an embodiment.

Referring to FIG. 1, a power management system includes a power provider 100, a smartmeter 200, an energy management system (EMS) 300, an electric device 400, and a terminal 500.

The power provider 100 is used as a power supply source that is driven by a power supply company (utility company) so as to generate and provide the power. The power provider 100 generates the power through atomic energy, hydraulic power, thermoelectric power, wind power, etc., and provides the generated power to the electric device 400 installed in each home.

In this case, in relation to the power provided to the electric device installed in each home, a predetermined amount of power is generated each hour such that the generated amount of power is provided to each home. In contrast, different amounts of power are consumed in each home according to individual periods. For example, power consumption of each home in a dawn or morning period zone is less than that of another time period such as the afternoon or dusk. In addition, power consumption of each home in spring or autumn is less than that in summer or winter.

Therefore, the power provider 100 determines the power rate of a period of low power consumption to be less than that of a high-power-consumption time period, determines the power rate of a season of low power consumption to be less than a high-power-consumption season, and provides power of the determined power rate to each home.

As described above, the power provider 100 controls power rates of each home to be elastically adjusted in response to power consumption of each home, and provides the adjusted power to each home, such that demand can be balanced.

The power provider 100 predicts power consumption on the basis of the generation amount of electric power, the past power use information for every season and every time period, and weather information, and determines power rates on the basis of the predicted power consumption. In this case, it may also be possible to establish a power rate level corresponding to the predicted power rates as necessary.

The power provider 100 collects power consumption amounts of individual homes classified according to individual power rates, and stores the collected power consumption information according to individual power rates, such that the power supply company calculates power rates depending upon power consumption for individual power rates of each home at every month, and charges each home the calculated power rates at every month.

The power provider 100 compares the periodically calculated power rates with monthly predetermined power rates so as to decide a limited amount of power to be supplied to each home. If the calculated power rates are higher than the monthly predetermined power rates, information about the excess of the monthly predetermined power rates is transmitted to the energy management system (EMS) 300 installed in the corresponding home, such that an event indicating the excess of monthly predetermined power rates is generated through the EMS 300 installed in each home.

The power provider 100 stores a threshold power amount for each home, compares power consumption amount for each home with a threshold power amount, and thus decides the limitation of power supply.

In this way, the power provider 100 manages the power demand of each home on the basis of the threshold power amount or the monthly predetermined power rates.

In this case, the threshold power amount for limiting the power supply of each home may be arbitrarily determined by the power supply company, or may be determined by agreement with the power supply company for each home. In addition, the monthly predetermined power rates of each home are determined by agreement with the power supply company for each home.

The power provider 100 stores and manages information about the generation of an event indicating an excess of threshold power for each user, and information about a current power consumption state caused by an event indicating the excess of monthly predetermined power rates.

The power provider 100 is connected to the smartmeter 200 installed in each home, the EMS 300, and each electric device over a network, such that it transmits and receives information regarding power demand management over the network. This network may be any of a wired network, a wireless network, a wired/wireless hybrid network, etc.

The smartmeter 200 is installed in each home, and includes a display such as a liquid crystal display (LCD), such that power consumed in each home is displayed in real time.

The smartmeter 200 is an electronic meter, which bidirectionally communicates with the power provider 100 and transmits the consumed power amount to the power provider 100 and the EMS 300.

The smartmeter 200 receives power rate information from the power provider 100, displays the received power rate information, and transmits the power rate information to the EMS 300.

The smart meter 200 displays a price level corresponding to the power rate information when receiving the power rate information from the power provider 100.

In this case, it is possible for the smartmeter 200 to transmit both the power rate information and the rate level information to the EMS 300 upon receiving both the power rate information and the rate level information from the power provider 100.

The EMS 300 may also be referred to as a Demand Response (DR) controller. The EMS 300 communicates with the smartmeter 200, and thus receives the power rate information from the smartmeter 200. In addition, the EMS 300 communicates with the electric device 400 such that it controls the driving of the operation of the electric device 400 on the basis of the power rate information of the power provider 100.

The EMS 300 may further receive the power rate level information when the power provider 100 transmits the power rate level information corresponding to the power rate information.

The EMS 300 receives information about excess threshold power and information about excess monthly predetermined power rates from the power provider 100, and informs the user of the received information.

Referring to FIG. 2, the EMS 300 includes a communication unit 310, a controller 320, a control panel unit 330, and a storage unit 340.

The communication unit 310 communicates with the smartmeter 200, such that it receives power rate information and power rate level information corresponding to the power rate information from the smartmeter 200 and then transmits the received information to the controller 320.

The communication unit 310 communicates with the electric device 400, by transmitting a driving control signal of the controller 320 to the electric device 400.

The communication unit 310 transmits variety user information stored in the storage unit 340 to the power provider 100, such that the power provider 100 can determine which home corresponds to information about power consumption for each period.

The communication unit 310 transmits power rate information and power rate level information to the terminal 500 upon receiving a command from the controller 320.

In this case, the power rate information and the power rate level information may respectively be power rates for each hour of each day and power rate level information for each hour of each day having been received from the power provider 100, and may be current power rates and current power rate level information having been transmitted from the power provider 100.

The controller 320 controls the control panel unit 330 upon receiving the power rate information and the power rate level information of the power provider 100 through the smartmeter 200, so as to output the power rates and the power rate level.

In this case, the controller 320 confirms display information for each power rate level on the basis of information stored in the storage unit 340, and displays different types of display information for individual power rate levels according to the confirmed result. In this case, the display information is color information or icon information.

The controller 320 confirms a rate level corresponding to power rates on the basis of information stored in the storage unit 340 under the condition that only the power rate information is transmitted from the power provider 100, and outputs power rates and rate levels by controlling the control panel unit 330.

In this case, the rate levels stored in the storage unit 340 are established and stored in the controller 320. The controller 320 collects all the power rate information, arranges the collected information in descending numerical order of power rate, divides the arranged information into a plurality of ranges, and assigns different power rate levels to the divided ranges in such a way that power rate levels are established.

In this case, the number of the power rate levels may be 2, 3 or more, and a plurality of levels may have different power rates and different allowable instantaneous powers.

Let us assume that the number of power rate levels is 4 (RTP1 to RTP4). In more detail, the power rate level RTP1 is the lowest power rate level, and the power rate level RTP4 is the highest power rate level. Power rate level is proportional to power rate.

In more detail, if the controller 320 receives power rates for each hour of each day and their power rate level information from the power provider 100, it controls the control panel unit 330 to output power rates for each hour of each day and power rate level information.

In addition, upon receiving current power rate information and power rate level information from the power provider 100, the controller 320 predicts the future power rates and power rate level on the basis of the past power consumption pattern information stored in the storage unit 340, and outputs the current power rates, the current power rate level, the predicted future power rates, and the predicted future power rate level by controlling the control panel unit 330.

In this case, the current power rates, the current power rate level, the predicted future power rates, or the future power rate level may indicate power rates and power rate level for each of the 24 hours of a given day.

The past power consumption pattern information may indicate the previous day's power consumption pattern, the previous week's power consumption pattern, and the previous year's power consumption pattern.

The controller 320 confirms the next power rate level, calculates the remaining time until the next power rate level begins, and outputs the remaining time by controlling the control panel unit 330.

The controller 320 controls power information such as the amount of power consumption for each hour to be stored in the storage unit 340.

Upon receiving the current power rate level from the power provider 100, the controller 320 decides a power rate level for a predetermined time starting from the current time using the past power consumption pattern information, confirms power rates corresponding to the power rate level for every hour starting from the current time on the basis of the information stored in the storage unit 340, and displays power rate levels for every hour starting from the current time and power rate information for every hour by controlling the control panel unit 330.

In this case, the predetermined time may be set to 24 hours as necessary.

Upon receiving a signal for selecting an option button from the input unit 331, the controller 320 extracts option information stored in the storage unit 340, such that it outputs the extracted option information by controlling the control panel unit 330.

In this case, the option information includes sound information, color information, icon information, and clock window design information for identifying individual power rate levels. Sound information for individual power rate levels, color information, and icon information are changed by a user-selected signal, and a clock window design is also changed by such a user-selected signal.

Upon receiving any one of power rate level selection signals displayed on the clock window A, the controller 320 controls the control panel unit 330 so as to output detailed information of the selected power rate level.

When the several electric devices 400 are controlled, the controller 320 predicts instantaneous power amount of the electric device 400 to be driven, and compares the predicted instantaneous power amount with the allowed instantaneous power amount. If the predicted instantaneous power amount is equal to or greater than the allowed instantaneous power amount, driving of several electric devices 400 is controlled according to predetermined priority information, and the controlled result is output by controlling the control panel unit 330 so as to inform the user of the controlled result.

That is, if the predicted instantaneous power amount is larger than the allowed instantaneous power amount, the controller 320 sequentially powers off electric devices in ascending numerical order of priority. In this case, the priorities of several electric devices may be predetermined and stored, or may be entered by a user and then stored or changed.

If power rates corresponding to the current power consumption amount are close to monthly predetermined power rates, or if the current power rates are higher than the monthly predetermined power rates, the controller 320 controls the control panel unit 330 and outputs an event indicating an excess of monthly predetermined power rates (the monthly bill).

The control panel unit 330 receives an indication message corresponding to the user's indication, outputs a variety of information corresponding to the indication of the controller 320, and informs the user of the variety of information.

The control panel unit 330 includes an input unit 331, a display 332, and a sound unit 333.

The input unit 331 includes an option button. If the user selects the option button, the selected option signal is transmitted to the controller 320.

In this case, the option button includes sound information, color information, clock window design information, and icon information. If the power rate level is selected by the user and at least one of sound information and color information is entered, the entered input is established in relation to the power rate level.

That is, sound of individual power rate levels may be established and changed, the color of individual power rate levels may be established and changed or the icon (emoticon) for individual power rate levels may be established and changed.

In this case, when establishing the count, color, or icon (emoticon) of individual power rate levels, only one power rate level may be established according to user selection, as necessary.

In this case, the icon may include facial expression emoticons (e.g., smiling, frowning, and perspiring expressions), running emoticon having speed, and a character ' ' icon. In this case, the running emoticon becomes faster as the power rate level increases. The higher the power rate level, the higher the number of ' ' icons.

In this case, the icon may include facial expression emoticons (e.g., smiling, frowning, and perspiring expressions), a moving icon indicating speed, and a character ' ' icon. In this case, the speed of the moving icon increases in proportion to the power rate level. The higher the power rate level, the higher the number of ' ' icon.

The input unit 331 receives user information, receives priority information of several electric devices 400, receives the driving indication signal from the user, receives the driving reservation time information from the user, and transmits each input signal to the controller 320.

The input unit 331 is integrated with the display 340, thereby forming a touchscreen.

The display 332 includes a clock window A and an information window B. The clock window A displays power rate levels of each hour of each day and icons representing each power rate level. The information window B displays the current power rates, the current power rate level, the next power rates, the next power rate level, the remaining time until the next power rate level begins and an option button. In addition, the clock window A may also display the icon at the highest power rate level (RTP4) only.

The display 332 may display allowable instantaneous power, and may also display the power rates assessed until the current time.

In this case, the clock window A may take the form of a circular clock, a bar clock, a digital clock, etc.

The sound unit 333 outputs an alarm sound at the highest power rate level (RTP4), such that the user can readily recognize high power rates.

The sound unit 333 may audibly output the next power rate level and may also audibly output the remaining time until the next power rate level begins.

The sound unit 333 outputs a sound signal corresponding to the power rate level to be changed at the power rate level change time point, such that it informs the user of the power rate level to be changed and a time point at which the power rate level is to be changed.

The sound unit 333 outputs a sound signal at the driving start and end time points of the electric device, informs the user of the driving start and end time points of the electric device, and outputs a sound signal at a time of the excess of the allowable instantaneous power, a time of the excess of monthly predetermined power rates, and a time of the excess of threshold power, such that the user can easily recognize the time of the excess of allowed instantaneous power, the time of the excess of monthly predetermined power rates, and the time of the excess of threshold power.

In this case, the sound may be a voice signal, a bell sound (ringtone), a mute signal, etc. In response to the user selection, different sounds are assigned to each power rate level.

If all the power rate level sounds are established as a default, it is possible to generate an alarm sound only when a current level is changed to the highest power rate level (RTP4).

The control panel unit 330 will hereinafter be described with reference to FIGS. 3 to 6.

Figure 3:
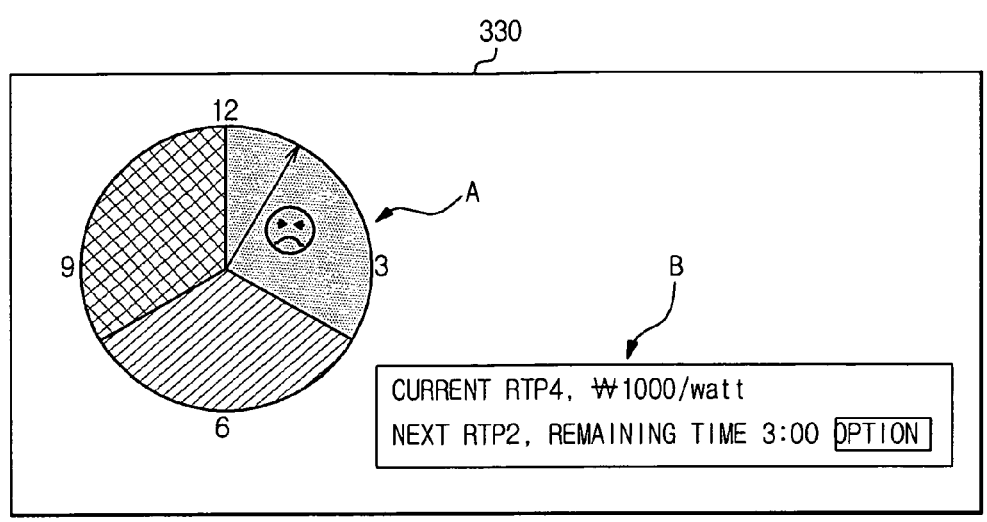
FIGS. 3 to 6 exemplarily show a control panel part installed in a power management system according to an embodiment.

FIG. 3 shows the control panel unit 330 for displaying the circular clock window A and the information window B.

The circular clock window A is a 12 hour clock, and displays a current time of 1:00 o'clock using the hour hand. The inner region of the circular clock window A is divided into sections having different colors indicating respective power rate levels. The circular clock window A may also be a 24 hour clock.

The circular clock window A may display the future power rate level on the basis of the current time. For example, if the current time is 1 PM, a power rate level between 9:00 o'clock and 12:00 o'clock is a power rate level between 9 PM and 12 PM, instead of a power rate level between 9 AM and 12 AM.

For example, if the number of power rate levels is 4, the power rate level RTP1 is displayed in green, the power rate level RTP2 is displayed in yellow, the power rate level RTP3 is displayed in orange, and the power rate level RTP4 is displayed in red.

In this case, the colors of individual power rate levels may be predetermined, or may be set by the user.

The circular clock window A displays the frowning emoticon in the highest power rate level (RTP4) region, such that it can allow the user to easily recognize that a current power rate level is the highest power rate level.

The information window B displays the current power rate level (RTP4), displays the current power rate (1000/Watt), displays the next power rate level (RTP2), and the remaining time (3 hours) until the next power rate level begins, and then displays an option button.

If the option button of the information window B is selected by the user, the control panel unit 330 displays sound information, color information, icon information, and clock window design information for identifying individual power rate levels.

Figure 4:
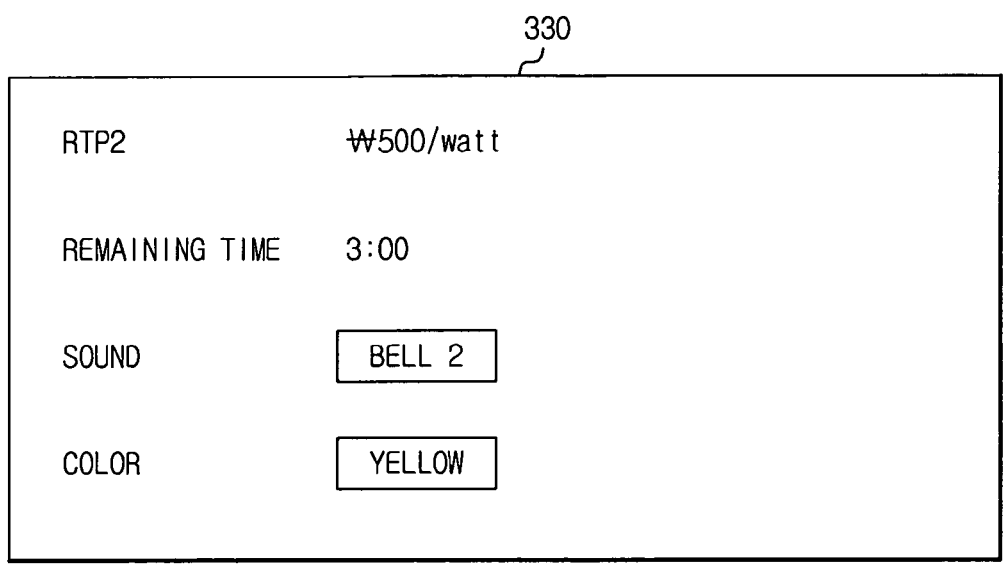

If the user selects an oblique region of the circular clock window A, the control panel unit 330 displays detailed information of the corresponding power rate level (RTP2) as shown in FIG. 4.

In this case, the detailed information includes the selected power rate level (RTP2), a power rate (500/Watt) of the selected power rate level, and the remaining time (3 hours) until the RTP2 level begins, and outputs identification (ID) sound (bell 2) and a color (yellow) corresponding to the RTP2 level.

In this case, if the user selects the part of 'Bell 2', the sound for the RTP2 level may be changed. In addition, if the user selects the part of 'Yellow', the color of the RTP2 level may be changed.

Figure 5A:
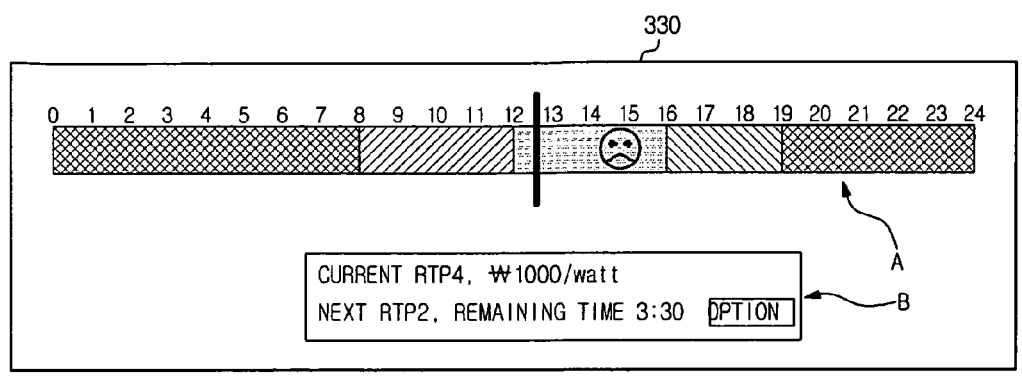
Figure 5B:
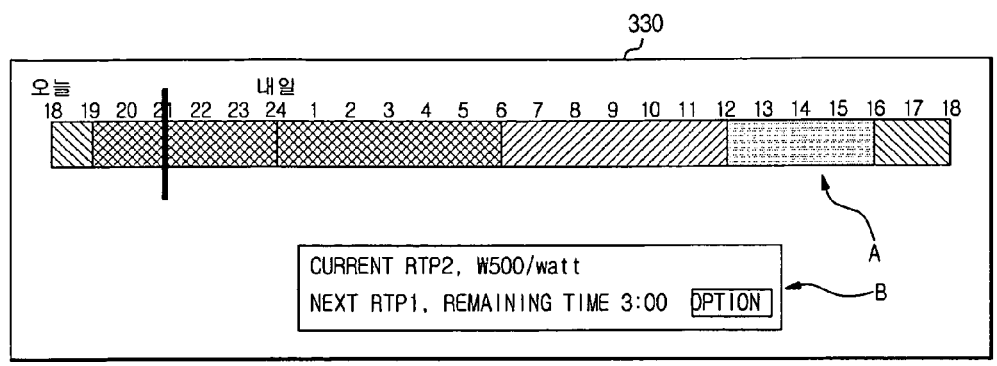

FIGS. 5A and 5B illustrate the control panel unit 330 including a bar-type clock window A and an information window B.

Referring to FIG. 5A, the bar-type clock window A displays 24 hours of each day, and displays the current time 12:30 PM using the hour hand. In this case, the bar-type clock window A may be horizontally or vertically arranged. The inner region of the clock window A may be displayed in different colors corresponding to different power rate levels of individual periods.

For example, if the number of power rate levels is 4, the power rate level RTP1 is displayed in green, the power rate level RTP2 is displayed in yellow, the power rate level RTP3 is displayed in orange, and the power rate level RTP4 is displayed in red. In this case, the colors of individual power rate levels may be predetermined, or may be established by the user.

The circular bar-type clock window A displays the frowning emoticon in the highest power rate level (RTP4) region, such that the user can easily recognize that a current power rate level is the highest power rate level.

The information window B displays the current power rate level (RTP4), displays the current power rates (1000/Watt), displays the next power rate level (RTP2), and the remaining time (3 hours) until the next power rate level begins, and then displays an option button.

If the bar-type clock window A displays 24 hours of each day, as the current time gradually approaches 24:00, the user has higher difficulty in recognizing the future power rate level through the bar-type clock window A. Therefore, the bar-type clock window A is designed to display a total of 24 hours by shifting time at intervals of a predetermined time.

Referring to FIG. 5B, if a predetermined time is 3 hours, the bar-type clock window A shifts the time displayed on the bar-type clock window at intervals of 3 hours, and displays the shifted time, so that it displays a total of 24 hours.

The bar-type clock window A shows that a time is shifted at 18:00 of each day, displays a total of 24 hours from 18:00 of each day to 18:00 the next day, and displays a current time of 21:00 using the hour hand.

In addition, the bar-type clock window may also display power information for a total of 24 hours starting from the current time.

The information window B displays the current power rate level (RTP4), displays the current power rates (1000/Watt), displays the next power rate level (RTP2), and the remaining time (3 hours 30 minutes (i.e., 3.5 hours)) until the next power rate level begins, and then displays an option button.

In this case, if the user selects the option button of the information window B, the control panel unit 330 displays sound information, color information, icon information, and clock window design information for identifying individual power rate levels such that the user can easily select desired information from among the displayed information.

The control panel unit 330 displays detailed information of the corresponding power rate level when a region contained in the bar-type clock window A is selected by the user.

Figure 6:
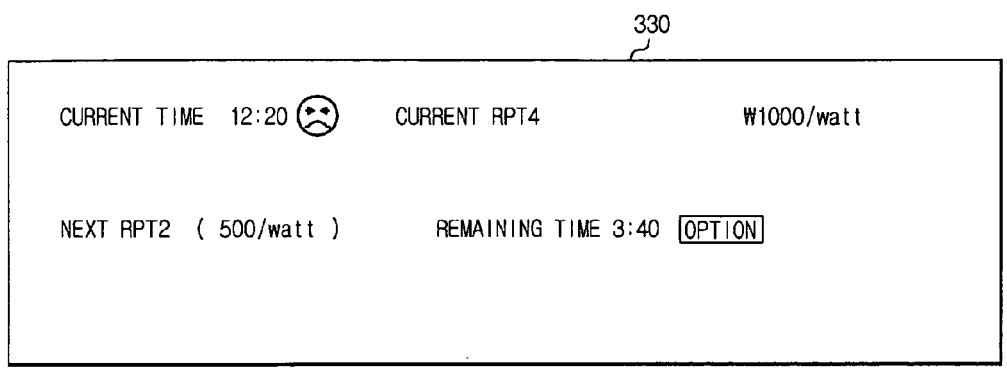

FIG. 6 shows the control panel unit 330 for displaying the digital-type clock window and the information window.

The digital-type clock window displays the current time of 12 hours and 20 minutes as a digital display format 12:20. An icon corresponding to the power rate level of the current time is displayed in the vicinity of the clock window.

For example, if the power rate level of the current time is the highest power rate level (RTP 4), the frowning emoticon is displayed. If the current time is set to the lowest power rate level (RTP 1), the smiling emoticon is displayed. As a result, the user can easily recognize the power rate level of the current time.

The information window displays the current power rate level (RTP 4), and displays the current power rates (1000/Watt), displays the next power rate level (RTP 2), and the remaining time (3 hours and 40 minutes) until the next power rate level begins, and then displays an option button.

If the option button of the information window is selected by the user, the control panel unit 330 displays sound information, color information, icon information, and clock window design information for identifying individual power rate levels.

The storage unit 340 stores power consumption for every period of each day in real time, and stores the past power consumption pattern information. In this case, the past power consumption pattern information includes the previous day's power consumption pattern information, the previous week's power consumption pattern information, and the previous year's power consumption pattern.

In this case, the previous day's power consumption pattern information may be used for recognition of the power consumption pattern for every period, the previous week's power consumption pattern information may be used for recognition of the power consumption pattern for every day, and the previous year's power consumption pattern information may be used for recognition of the power consumption pattern for every month.

The storage unit 340 stores sound option information, color option information, and emoticon option information for identifying individual power rate levels, and further stores clock window design option information of the control panel unit 330.

In addition, the storage unit 440 stores sound information, color information, and icon information for individual power rate levels established by user selection, and stores clock window design information of the control panel unit 330.

The electric device 400 may be any one of a television, a washing machine, a dryer, a vacuum cleaner, an air-conditioner, a stove, an electric oven, a refrigerator, etc. The electric device 400 communicates with an external part through which the user can input commands. If a current time reaches a predetermined reservation time, the electric device 400 transmits information about the reservation time to the EMS 300. The electric device 400 is driven in response to the driving command of the EMS 300, the power consumed for driving the electric device 400 is metered and information about the metered power is transmitted to the EMS 300.

The terminal 500 may be any of a mobile communication terminal (such as a smartphone, PDA, or a mobile phone), a personal computer (PC), a laptop, a television, etc., and can perform communication and display functions.

The terminal 500 communicates with the EMS 300, receives power information for each hour of each day from the EMS 300, and outputs power information for each hour of each day. The terminal 500 includes an application for displaying power information for each hour of each day received from the EMS 300.

In this case, the power information for each hour of each day may be power rate information and power rate level information received from the power provider 100, and may be any of the future power rates predicted by the controller 320, the current power rate information, and the current power rate level information.

The terminal 500 may also display power information for every hour during a total of 24 hours starting from the current time.

The terminal 500 executes the application upon receiving an application execution command from the user, and displays power information through this application.

The terminal 500 may display the power information in the form of a popup, or the power information may be displayed at an edge of the display.

Figure 7:
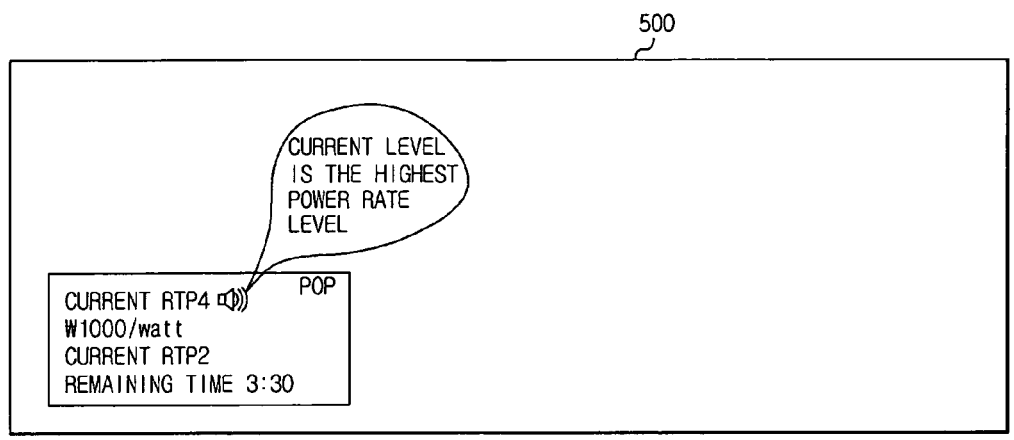
FIG. 7 exemplarily shows a terminal for communicating with a power management system according to an embodiment.

Referring to FIG. 7, the terminal 500 displays the power information in the form of a popup at an edge of the display. This popup may display the current power rate level, the current power rate, the next power rate level, the remaining time until the next power rate level begins, and audibly informs the user of the current power rate level. That is, the terminal 500 audibly outputs the current power rate level RTP4 as an audio message "the current power rate level is the highest power rate level (RTP4)", and audibly informs the user of the message.

In addition, the terminal 500 may also simply display a text message "The current power rate level is the highest power rate level.", omitting "(RTP4)".

In addition, the terminal 500 may also display the power rates of each day and the power rate level as a screensaver for the display.

Figure 8:
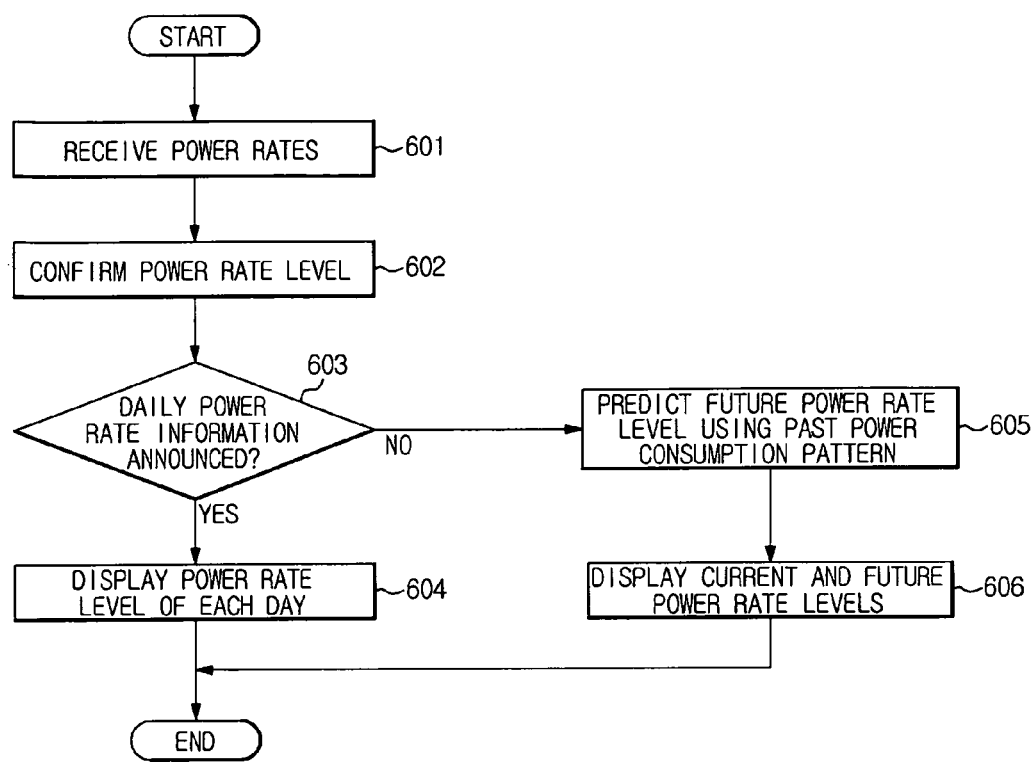
FIG. 8 is a flowchart illustrating a method for controlling a power management system according to an embodiment.

FIG. 8 is a flowchart illustrating a method for controlling a power management system including the EMS according to one embodiment. The method for controlling the power management system including the EMS will hereinafter be described with reference to FIG. 2.

Upon receiving the power rates from the power provider 100 through the smartmeter 200 at operation 601, the power management system 300 confirms the power rate level corresponding to the power rates on the basis of the information stored in the storage unit 340 at operation 602.

In addition, if the power provider 100 provides the power rates and the power level information, the EMS 300 may also receive both the power rates and the power level information from the power provider 100 as necessary.

The EMS 300 determines whether the power rate information received from the power provider 100 is daily power rate information at operation 603.

In this case, if the power rate information received from the power provider 100 is the daily power rate information, the EMS 300 displays power rates for each hour of each day and power rate level information for each hour of each day through the control panel unit 330 at operation 604.

If the EMS 300 determines that the power rate information received from the power provider 100 is the current power information not the daily power rate information of each day, it predicts the future power rates and the future power rate level on the basis of the stored past power consumption pattern information at operation 605.

In this case, the EMS 300 predicts a daily power rate level and daily power rate information on the basis of the current power information.

Upon receiving the current power information from the power provider 100, the EMS 300 predicts a daily power rate level for a predetermined number of hours (24 hours) starting from the current time on the basis of the received current power information and the past power consumption pattern information, and may also predict power rates according to the predicted power level.

In this case, the past power consumption pattern information is the previous day's power consumption pattern information, the previous week's power consumption pattern information, and the previous year's power consumption pattern information. The EMS 300 recognizes a power consumption pattern for each hour using the previous day's power consumption pattern information, recognizes a power consumption pattern for each day using the previous week's power consumption pattern information, and recognizes a power consumption pattern for each month using the previous year's power consumption pattern information.

Through the control panel unit 330, the current power rate, the current power rate level, the predicted future power rates and the predicted future power rate level are displayed at operation 606.

In this case, the current power rate, the current power rate level, the predicted future power rate, and the predicted future power rate level may be daily power rates and the daily power rate level for 24 hours of each day, or may be power rates and a power rate level for 24 hours starting from the current time.

The power rate levels of individual periods are displayed in different colors on the clock window of the control panel unit 330. In the case of the bar-type clock window, a time displayed on the bar-type clock window is shifted at intervals of a predetermined time, so that a total of 24 hours is displayed.

In addition, different icons may be displayed at power rate levels of individual periods of the clock window, or only one icon may be displayed at the highest power rate level.

In addition, different numbers of W characters are assigned to individual power rate levels of the clock window, or running emoticons having different speeds may be assigned to individual power rate levels. Also, the number of beads of sweat on a perspiring face emoticon or the rate at which the perspiring face emoticon sweats may be controlled according to the power rate level.

Whenever the power rate level is changed, the power management system according to the present invention outputs a sound signal corresponding to the changed power rate level, such that the user can easily recognize the power rate level to be changed. Alternatively, the power management system according to the present invention outputs a sound signal for a predetermined period of time at a specific time at which the highest power rate level begins, such that the user can recognize that the current power rate level is the highest power rate level.

As is apparent from the above description, the power management apparatus allows the user to intuitively recognize the current power rate and the current power rate level. The power management apparatus can predict future power rates and future power rate level, so as to establish an optimum power use schedule. As a result, the electric device can be effectively driven, resulting in reduction in power consumption.

In addition, if the current power rate level changes, the power management apparatus audibly informs the user of the changed power rate level, such that the user can easily and quickly recognize variation in power rate level.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A power management apparatus, comprising:
a storage to store information of power rate levels corresponding to a plurality of power rates and display information respectively indicating the power rate levels;
a communicator to receive a power rate for each hour of a given time period starting from a current time;
a controller to identify a current power rate and a future power rate based on the received power rate for each hour, identify a power rate level and display information corresponding to each of the identified current power rate and the identified future power rate on basis of the information stored in the storage; a control panel including a clock window, wherein the clock window displays the given time period and the current time, and displays the identified display information on each time region of an inner region of the clock window, and wherein:
the display information includes at least one of color information and icon information,
the power management apparatus further comprises an input to receive one of the stored power rate levels and the respective display information for the received power rate level,
when display information corresponding to a power rate level is received through the input, the controller changes the display information corresponding to the received power rate level among the stored power rate levels to the received display information, and
when a display command for displaying at least one of the stored power rate levels is received through the input, the controller confirms an hour corresponding to the at least one power rate level, and controls to display the display information corresponding to the at least one power rate level in a region of the confirmed hour on the clock window,
the controller determines a next power rate among the identified future power rates, and a next power rate level corresponding to the next power rate, and calculates remaining time until the current power rate level changes to the next power rate level, and
the control panel further includes an information window, which displays the current power rate level, the current power rate, the next power rate level, the next power rate, and the remaining time.

2. The apparatus according to claim 1, wherein the clock window is displayed in a form of any of a circle, and a bar.

3. The apparatus according to claim 1, wherein the control panel unit includes:
a display to display power rate information, color information, and sound information corresponding to the received power rate level.

4. The apparatus according to claim 1, wherein the storage further includes sound information associated with each of the power rate levels.

5. The apparatus according to claim 1, wherein the control panel includes a sound unit to output a sound signal corresponding to the power rate level among the stored power rate levels, the sound signal to be changed when the power rate level is changed.

6. The apparatus according to claim 1, wherein
the input receives sound information associated with each power rate level among the stored power rate levels,
wherein the controller changes the sound information associated with each power rate level among the stored power rate levels.

7. The apparatus according to claim 1, wherein the communicator communicates with an external terminal and transmits the power rate levels associated with the received power rates displayed as different types of display information.

8. A power management apparatus comprising:
a storage to store power rate levels corresponding to a plurality of power rates, store display information respectively indicating the power rate levels, and store past power consumption pattern information;
a communicator to receive a current power rate from a power provider;
a controller to associate a current power rate level among the stored power rate levels with the received current power rate, predict a future power rate and a future power rate level on basis of the stored past power consumption pattern information, the received current power rate, and the associated current power rate level; and
a control panel to display the received current power rate and the predicted future power rate using the associated current power rate level and the predicted future power rate level, wherein the current power rate level and the predicted future power rate level are displayed as display information corresponding to the current power rate level and the predicted future power rate level on a clock window,
wherein:
the clock window displays a given time period and a current time, in which an inner region of the clock window is divided into sections each having different display information indicating a respective power rate levels,
the display information is at least one of color information and icon information,
the power management apparatus further comprises an input to receive one of the stored power rate levels and the respective display information for the received power rate level,
when display information corresponding to a power rate level is received through the input, the controller changes the display information corresponding to the received power rate level among the stored power rate levels to the received display information,
when a display command for displaying at least one of the stored power rate levels is received through the input, the controller confirms an hour corresponding to the at least one power rate level, and controls to display the display information corresponding to the at least one power rate level in a region of the confirmed hour on the clock window,
the controller determines a next power rate among the predicted future power rates, and a next power rate level associated with the next power rate, and calculates a remaining time until the current power rate level changes to the next power rate level, and
the control panel further includes an information window, which displays the current power rate level, the current power rate, the next power rate level, the next power rate, and the remaining time.

9. The apparatus according to claim 8, wherein the past power consumption pattern information includes previous day's power consumption pattern information, previous week's power consumption pattern information, and previous year's power consumption pattern information.

10. The apparatus according to claim 8, wherein the control panel displays the predicted future power rate level or a current power rate level for each hour of a given time period starting from a current time.

11. The apparatus according to claim 8, wherein the storage unit further includes sound information for each power rate level.

12. The apparatus according to claim 11, wherein the control panel includes a sound to output a sound signal corresponding to a power rate level, the sound signal to be changed when the power rate level is changed.

13. A method for controlling a power management apparatus comprising:
by a controller:
upon receiving a power rate for a given time period, identifying a current power rate level and a future power rate level corresponding to each hour on basis of a power rate,
displaying the current power rate level and the future power rate level corresponding to each hour on a clock window,
when display information corresponding to a power rate level is received through an input, changing the display information corresponding to the received power rate level among stored power rate levels to the received display information,
when a display command for displaying at least one of the stored power rate levels is received through the input, confirming an hour corresponding to the at least one power rate level, and controlling to display the display information corresponding to the at least one power rate level in a region of the confirmed hour on the clock window,
wherein:
the clock window displays a given time period and a current time, an inner region of the clock window is divided into sections each having different display information indicating the current power rate level and the future power rate level,
each displayed power rate level is displayed as different types of display information and the display information is at least one of color information and icon information, and
the method for controlling a power management apparatus comprising:
determining a next power rate level associated with a next power rate among the identified future power rate levels, and calculating a remaining time until the current power rate level changes to the next power rate level, and
displaying the current power rate level, the current power rate, the next power rate level, the next power rate, and the remaining time in an information window.

14. The method according to claim 13, wherein the displaying of each power rate level as different types of display information includes:
identifying time regions of the clock window on basis of the power rate level corresponding to each hour; and
displaying the individual time regions of the clock window in different colors assigned to each power rate level.

15. The method according to claim 13, wherein the displaying of each power rate level as different types of display information includes:
identifying time regions of the clock window on the basis of the power rate level corresponding to each hour; and
displaying the time regions of the clock window using different icons assigned to each power rate level.

16. A method for controlling a power management apparatus comprising:
by a controller,
associating a current power rate level with a current power rate upon receiving the current power rate from a power provider;
predicting a future power rate and a future power rate level using a prestored past power consumption pattern;
displaying the current power rate level and the predicted future power rate level as display information indicating the respective power rate levels,
wherein the method further comprising:
when display information corresponding to a power rate level is received by an input, changing the display information for the received power rate level to the received display information; and
when a display command for displaying at least one of the stored power rate levels is received by the input, confirming an hour corresponding to the at least one power rate level, and controlling to display the display information corresponding to the at least one power rate level in a region of a confirmed hour on the clock window;
wherein:
the display information is at least one of color information and icon information,
the clock window displays a given time period and a current time, in which an inner region of the clock window is divided into sections each having different display information indicating a respective power rate levels, and
the method for controlling a power management apparatus further comprising:
determining a next power rate among the predicted future power rates, and a next power rate level associated with the next power rate, and calculating a remaining time until the current power rate level changes to the next power rate level; and
displaying the current power rate level, the current power rate, the next power rate level, the next power rate, and the remaining time in an information window.

17. The method according to claim 16, wherein the past power consumption pattern includes:
a power consumption for each hour recognized using a previous day's power consumption pattern;
a power consumption for each day recognized using a previous week's power consumption pattern; and
a power consumption for each month recognized using a previous year's power consumption pattern.

18. The method according to claim 16, wherein the displaying of the current power rate level and the predicted future power rate level as different types of display information includes:
identifying time regions of the clock window on basis of the current power rate level or the predicted future power rate level corresponding to each hour; and displaying the time regions of the clock window in different colors assigned to each power rate level.

19. The method according to claim 16, wherein the displaying of the current power rate level and the predicted future power rate level as different types of display information includes:
   identifying time regions of the clock window on basis of the current power rate level or the predicted future power rate level corresponding to each hour; and
   displaying the time regions of the clock window using different icons assigned to each power rate level.

20. The method according to claim 16, further comprising:
   determining whether display information corresponding to the current power rate level or the predicted future power rate level is selected; and
   displaying information of the selected power rate level responsive to a selection of the display information corresponding to the current power rate level or the predicted future power rate level.

21. The method according to claim 16, further comprising:
   determining a variation of the current power rate level; and
   outputting a sound signal corresponding to the current power rate level to be changed responsive to the current power rate level being changed.

* * * * *